United States Patent Office 3,514,164
Patented May 26, 1970

3,514,164
HYDRAULIC QUICK DISCONNECT TRACK PAD FASTENER
Michael W. Kaifesh, Warren, Mich., assignor to the United States of America as represented by the Secretary of the Army
Filed Sept. 10, 1968, Ser. No. 758,724
Int. Cl. B62d 55/26
U.S. Cl. 305—55　　　　　　　　　　　　　　　6 Claims

ABSTRACT OF THE DISCLOSURE

Apparatus providing a quick detachable means of securely mounting removable track pads to tank track shoes.

---

Figure 1:
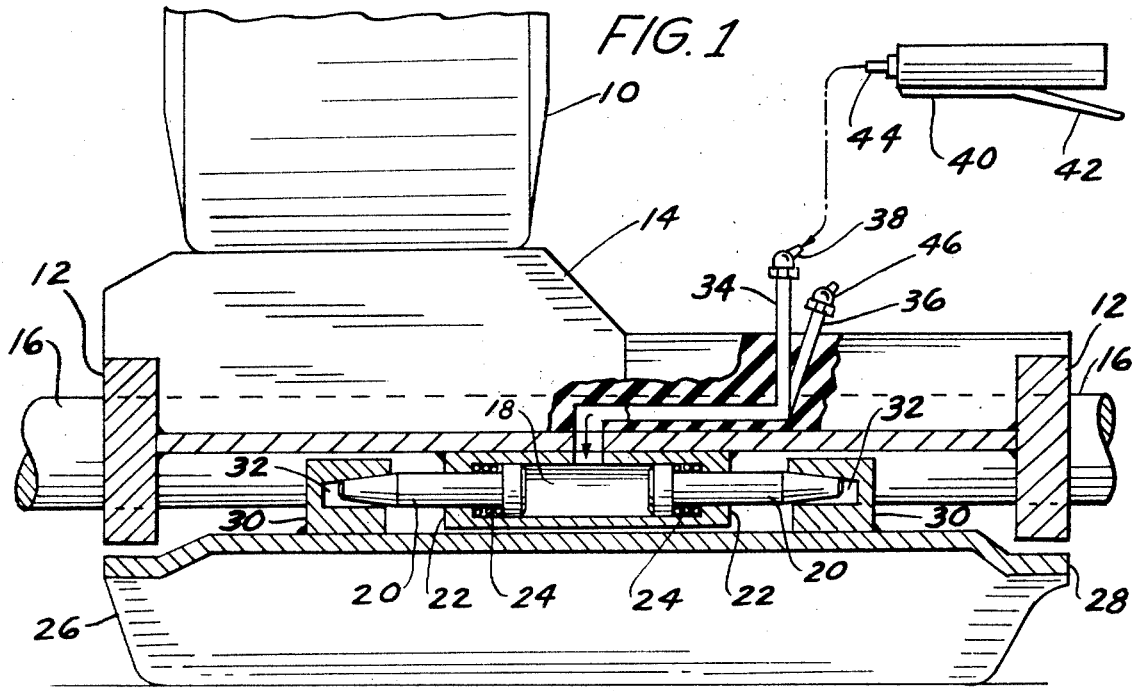

The invention described herein may be manufactured, used and licensed by or for the Government for governmental purposes without payment to me of any royalty thereon.

This invention relates to a new and improved means for securely detachably mounting removable track pads to track shoes of the type used in combination with the endless tracks of certain types of tractors, tanks, troop carriers, or the like.

In the past various arrangements utilizing bolts and nuts were the means used for securing removable track pads to track shoes. This method of attaching and detaching track pads was found to be extremely time consuming and physically difficult and required components which were not integral with the shoe or pad assembly and therefore, on occasions, became lost during usage and misplaced in the supply cycle. In an environment, such as snow or mud, where additional track aggressiveness is required to increase vehicle mobility, no power equipment is available for loosening nuts and troops in the field would have to perform the time consuming and physically difficult task of manually removing nuts. On account of this situation pads are not removed for the purpose of increasing mobility, but are removed only when replacement is required.

The principal object of the present invention is to provide new and improved means for securely detachably mounting removable track pads to track shoes.

Another object of the invention is to provide a new and improved means for detachably mounting removable track pads to track shoes incorporatping therein hydraulic means to accomplish same.

Another object of the invention is to provide a new and improved means for detachably mounting removable track pads to track shoes using a hydraulic pressure source such as a standard hand grease gun in combination with "Zerk" fittings, or an air pressure grease system found in garages, maintenance shops or the like.

Figure 2:
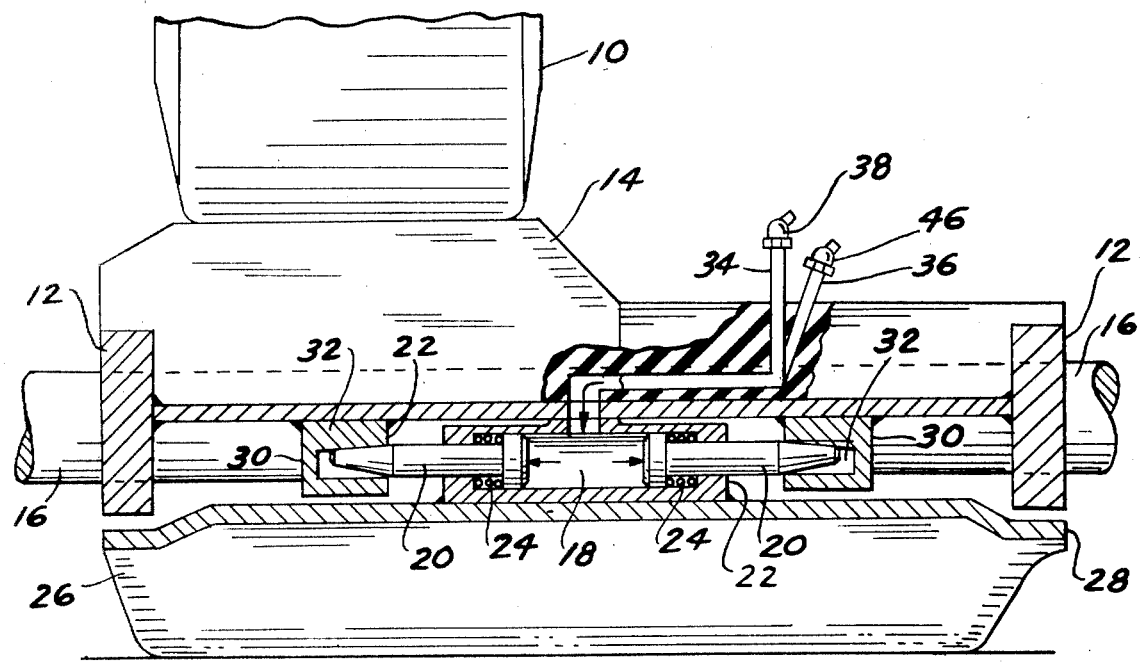

The above and other objects of the invention will appear more fully from the following more detailed description, and from the drawing, wherein:

FIG. 1 is a cross sectional view of the device, showing the main cylinder secured to the track pad; and FIG. 2 is a cross sectional view of an alternate form of the invention showing the main cylinder secured to the track shoe.

Referring now to the drawing, the numeral 10 designates a vehicle road wheel used extensively on military vehicles, the same being adapted to ride upon a track shoe 12, formed of steel or the like and containing an integral rubber portion 14. The track shoe 12 is designed to support opposed bearing member 16. The track shoe 12 also has secured to the under side thereof a cylinder member 18, said cylinder member having disposed therein, for longitudinal movement, a pair of opposed pistons 20, the same passing through openings 22 in the opposed ends of cylinder 18 against spring member 24.

Numeral 26 designates a pad member the same having a backing plate 28 thereon. Secured to the backing plate 28 are a pair of opposed blocks 30, the same having recessed portions 32 therein adapted to receive the tapered ends of pistons 20. A hydraulic line 34 passes through rubber insert 14 into cylinder 18, the same having formed therewith a relief pipe 36. Line 34 has a Zerk fitting 38 thereon and relief pipe 36 a relief cap 46. Numeral 40 designates a pressure source grease gun having a pump handle 42 and tit 44 thereon.

The alternate form of the invention shown in FIG. 2 of the drawing is quite similar to the device shown in FIG. 1 with the exception of the reversal of cylinder 18, the same being secured to backing plate 28 and opposed blocks 30 are secured to shoe 12.

The manner in which the device operates is as follows:
When it is found necessary to attach track pads to track shoes to prevent highway damage, the pad 26 is fitted manually into the lower recess portion of track shoe 12 so that the opposed blocks 30, secured to backing plate 28 of pad 26, are in longitudinal alignment with cylinder 18, which in turn is secured to the track shoe 12. Lever 42 of grease gun 40 is then pumped, after tit 44 of gun 40 is in engagement with Zerk fitting 38 secured to hydraulic line 34, causing grease to enter cylinder 18 and impinge the inward ends of pistons 20, causing same to move outwardly against springs 24 forcing the tapered forward ends of said pistons to enter recesses 32 in blocks 30 secured to pads 26 thereby providing a wedging action and locking the shoe and pad together.

To detach the track pad from the track shoe simply open relief cap 46 on end of relief pipe 36, which relieves pressure formed in cylinder 18 and springs 24 force pistons 20 to retract from recesses 32 in blocks 30, and grease in cylinder 18 to escape through hydraulic line 34 to relief pipe 36 through cap 46 to atmosphere. Once the pistons are disengaged from blocks 30 the track pad 26 falls out of track shoe 12.

In the alternate embodiment shown in FIG. 2 of the drawing the operation is the same as that of the preferred embodiment with the exception that the cylinder 18 is secured to the backing plate 28 of pad 26 and the opposed blocks 30 are secured to the track shoe 12. Otherwise the structures are identical.

There has been disclosed herein a new and improved hydraulic quick disconnect track pad fastener which provides a very rapid means of attaching and detaching track pads used on tank track shoes used on endless track means found on most military vehicles. It does away with various arrangements utilizing bolts and nuts for securing removable track pads to track shoes which method is extremely time consuming and physically difficult requiring components which are not integral with the shoe or pad assembly and therefore on occasion become lost during usage and misplaced in the supply cycle. In an environment, snow or mud, where additional track aggressiveness is required to increase vehicle mobility, no power equipment is available for loosening nuts, and troops would have to perform the time consuming and physically difficult task of manually removing nuts. Because of this situation, pads are not removed for the purpose of increasing mobility, but are removed only when replacement is required. With the present disclosure it has been found that, with each shoe having built into the same the cylinder and piston arrangement as shown—troops can apply or attach a complete set of pads on an endless track, going from shoe to shoe with a single grease gun, in from ten to twelve minutes regardless of atmospheric conditions.

This invention is not to be limited by the embodiment shown in the drawing and described in the description which is gven by way of example and not of limitation, but only in accordance with the scope of the appended claims.

I claim:

1. Means for removably mounting track pads to track shoes in an endless track member comprising, a track shoe having a cylinder member secured thereto, opposed piston members movably supported within said cylinder, means for transporting fluid to said cylinder, a track pad having opposed recessed block members secured thereto, an exposed fitting connected to said transporting means to detachably receive an hydraulic pressure source adapted to supply fluid to said cylinder to force said pistons into co-acting simultaneous locking engagement with said opposed block members on said track pad, additional means for releasing pressure in said cylinder to allow said fluid to escape from said cylinder, spring means to force said opposed pistons away from said block locking members which in turn allows said track pad member to become disengaged from said track shoe.

2. Means for removably mounting track pads to track shoes as set forth in claim 1 wherein said means for transporting fluid to said cylinder comprises a tube having a Zerk-type fitting on one end thereof.

3. Means for removably mounting track pads to track shoes as set forth in claim 1, wherein said hydraulic pressure source comprises a grease gun having pumping means thereon and means to detachably connect said gun to said Zerk-type fitting on said tube member.

4. Means for removably mounting track pads to track shoes as set forth in claim 1, wherein said means for releasing pressure in said cylinder comprises a pipe member having a relief valve on one end thereof.

5. Means for removably mounting track pads to track shoes in an endless track member comprising, a track shoe having opposed recessed block members attached thereto, a track pad having a cylinder member secured thereto, opposed piston members movably supported within said cylinder, means for transporting fluid to said cylinder, an exposed fitting connected to said transporting means to detachably receive an hydraulic pressure source adapted to supply fluid to said cylinder to force said pistons into co-acting simultaneous locking engagement with said opposed block members on said track shoe, means for releasing pressure in said cylinder to allow said fluid to escape from said cylinder, spring means to force said opposed pistons away from said block locking members which in turn allows said track pad members to become disengaged from said track shoe.

6. Means for removably mounting track pads to track shoes as set forth in claim 5 in which said track pad has thereon a backing plate adapted to receive and hold thereon said cylinder member.

References Cited

UNITED STATES PATENTS 1,041,450 10/1912 Drew _____ 305—55 X
2,398,631 4/1946 Foot.

FOREIGN PATENTS 432,330 7/1935 Great Britain.

RICHARD J. JOHNSON, Primary Examiner